United States Patent
Huang

(10) Patent No.: US 11,250,254 B2
(45) Date of Patent: Feb. 15, 2022

(54) METHODS AND SYSTEMS FOR DETECTING PHOTOGRAPH REPLACEMENT IN A PHOTO IDENTITY DOCUMENT

(71) Applicant: Alipay Labs (Singapore) Pte. Ltd., Singapore (SG)

(72) Inventor: Jiangbo Huang, Hangzhou (CN)

(73) Assignee: ALIPAY LABS (SINGAPORE) PTE. Ltd., Singapore (SG)

( * ) Notice: Subject to any disclaimer, the term of this patent is extended or adjusted under 35 U.S.C. 154(b) by 0 days.

(21) Appl. No.: 17/353,537

(22) Filed: Jun. 21, 2021

(65) Prior Publication Data

US 2022/0019786 A1 Jan. 20, 2022

(30) Foreign Application Priority Data

Jul. 14, 2020 (SG) ............................ 10202006694P

(51) Int. Cl.
*G06K 9/00* (2006.01)
*G06K 9/32* (2006.01)
(Continued)

(52) U.S. Cl.
CPC ..... *G06K 9/00456* (2013.01); *G06K 9/00288* (2013.01); *G06K 9/00463* (2013.01);
(Continued)

(58) Field of Classification Search
CPC .......... G06K 9/00288; G06K 9/00456; G06K 9/00463; G06K 9/3208; G06K 9/628;
(Continued)

(56) References Cited

U.S. PATENT DOCUMENTS

| 10,534,971 B2* | 1/2020 | Huber, Jr. ........... G06K 9/00449 |
| 2012/0246159 A1* | 9/2012 | Cowburn ............. G06K 9/0053 707/736 |

(Continued)

FOREIGN PATENT DOCUMENTS

| CN | 110751041 | 2/2020 |
| CN | 110796054 | 2/2020 |
| CN | 111191539 | 5/2020 |

OTHER PUBLICATIONS

Crosby et al., "BlockChain Technology: Beyond Bitcoin," Sutardja Center for Entrepreneurship & Technology Technical Report, Oct. 16, 2015, 35 pages.

(Continued)

*Primary Examiner* — Daniel G Mariam
(74) *Attorney, Agent, or Firm* — Fish & Richardson P.C.

(57) ABSTRACT

Disclosed are computer-implemented methods, non-transitory computer-readable media, and systems for detecting identity document photograph replacement. One computer-implemented method includes receiving image data of a cropped photograph region of an identity document (ID), where the ID comprises a photograph, and where the cropped photograph region comprises at least the photograph. Using a multiclass classification model and as a predicted ID category, an ID category is predicted based on the image data of the cropped photograph region, where the predicted ID category corresponds to a predefined class of a set of predefined classes in the multiclass classification model. The predicted ID category is compared with an indicated category of the ID. In response to a calculated mismatch between the predicted ID category and the indicated category of the ID, a determination is made that the cropped photograph region includes a replaced photograph.

25 Claims, 4 Drawing Sheets

(51) Int. Cl.
*G06K 9/62* (2022.01)
*G06N 3/04* (2006.01)

(52) U.S. Cl.
CPC ........... *G06K 9/325* (2013.01); *G06K 9/3208* (2013.01); *G06K 9/628* (2013.01); *G06N 3/04* (2013.01)

(58) Field of Classification Search
CPC ............ G06F 21/31; H04N 2201/3226; H04N 2201/3233; G06N 3/04; G06N 3/08
USPC ................................. 382/115, 159, 227, 298
See application file for complete search history.

(56) References Cited

U.S. PATENT DOCUMENTS

2019/0019282 A1* 1/2019 Atzmon ................. G06K 9/469
2019/0180086 A1 6/2019 Zhang
2020/0316979 A1* 10/2020 Bud ....................... B42D 25/23

OTHER PUBLICATIONS

Nakamoto, "Bitcoin: A Peer-to-Peer Electronic Cash System," www.bitcoin.org, 2005, 9 pages.

* cited by examiner

METHODS AND SYSTEMS FOR DETECTING PHOTOGRAPH REPLACEMENT IN A PHOTO IDENTITY DOCUMENT

CROSS-REFERENCE TO RELATED APPLICATIONS

This application claims priority to Singapore Patent Application No. 10202006694P, filed on Jul. 14, 2020, which is hereby incorporated by reference in its entirety.

TECHNICAL FIELD

The present specification relates broadly, but not exclusively, to methods and systems for detecting photograph replacement in a photo identity document.

BACKGROUND

Electronic-Know Your Customer (eKYC) is a digital due diligence process performed electronically by a business, which can verify the authenticity of its clients for assessing potential risks of illegal intentions towards the business relationship. To complete an eKYC process, a person may need to submit an image of a government-recognized photo identity document (ID) to prove his/her identity. In this context, identity fraud can take place when a fraudster uses another person's personal information, without authorization, to defraud or commit other crimes.

One of the most common ID frauds for photo IDs is to replace the photograph of the ID owner with a photograph of a different person. To date, Artificial Intelligence (AI) techniques have been used to detect such type of ID fraud. A conventional approach to detect photograph replacement in IDs is to treat it as a binary classification task, by training a binary classification model and outputting two classes: real ID and fake ID with photograph replacement. However, data labelling work involved in training the model can be quite time consuming. Given an ID that is in a card form, at least four steps are required to produce one sample of a fake ID card: getting an ID card, printing a photograph of a different person, placing the printed photograph on the ID card to cover the original photograph, and capturing an image of the resultant fake ID card and saving it for training. To obtain a model of high accuracy, at least thousands of samples are required, which can be highly time consuming and unlikely to be completed in a short period of time.

SUMMARY

Described embodiments provide methods, apparatuses, and systems for detecting photograph replacement in a photo identity document (ID). In some embodiments, the method can train a classification model of multiple classes based on samples of cropped photograph regions of IDs, each class corresponding to the category of the ID (e.g., a United States driver license, a Singapore National registration identity card, a mainland Chinese passport, or the like). A sample can be obtained by cropping the photograph region from an image of an ID and saving it as a new image. In some embodiments, a cropped photograph region can also include some background surrounding the photograph to comprehensively depict the style and features of the photograph region of the specific category of ID. In some embodiments, the classification model can be trained with convolutional neural network (CNN).

In some implementations, when an image of an ID is received, the photograph region can be cropped from the image and used as an input to the trained multiclass classification model. In some implementations, the photograph region may be obtained by pre-processing the image of the ID to generate an aligned image of the ID first, then cropping the photograph region from the aligned image based on the ID category and the photograph location information corresponding to the ID category. The model then predicts the ID category based on the cropped photograph region. If a real ID is used, the predicted category of the ID should match the category of the ID as indicated. Instead, if a fake ID with a replaced photograph is used, the predicted category of the ID should be different from the indicated category of the ID, because the cropped photograph region (which includes a replaced photograph) looks different from the cropped photograph region of that category of ID as indicated.

According to one embodiment, there is provided a method for detecting photograph replacement in a photo ID. The method includes: receiving image data of a cropped photograph region of an ID, wherein the ID comprises a photograph and the cropped photograph region comprises at least the photograph; predicting, by a multiclass classification model, an ID category based on the image data of the cropped photograph region, wherein the predicted ID category corresponds to one of a set of predefined classes in the multiclass classification model; comparing the predicted ID category with an indicated category of the ID; and in response to the predicted ID category mismatching the indicated category of the ID, determining that the cropped photograph region includes a replaced photograph.

In some implementations, the indicated category of the ID can be entered by the user during an eKYC process or selected from a list of ID categories. Possible ID categories can include national ID cards, passports, driver licenses from one or more countries. Correspondingly, the multiclass classification model may have a set of predefined classes that represent the different ID categories. In implementations, when a cropped photograph region of a new ID is received, the model may output a score for each class, and the class with a highest score is determined as the ID category based on the cropped photograph region. In some implementations, a predetermined threshold (e.g., 95 out of 100) can be set for the highest score, such that a conclusion of no photograph replacement is made if the highest score reaches the threshold.

According to other embodiments, one or more of these general and specific embodiments may be implemented using an apparatus including a plurality of modules, a system, a method, or a computer-readable media, or any combination of devices, systems, methods, and computer-readable media. The foregoing and other described embodiments can each, optionally, include some, none or all of the following embodiments.

BRIEF DESCRIPTION OF THE DRAWINGS

Embodiments and implementations are provided by way of example only, and will be better understood and readily apparent to one of ordinary skill in the art from the following written description, read in conjunction with the drawings, in which.

Figure 1:
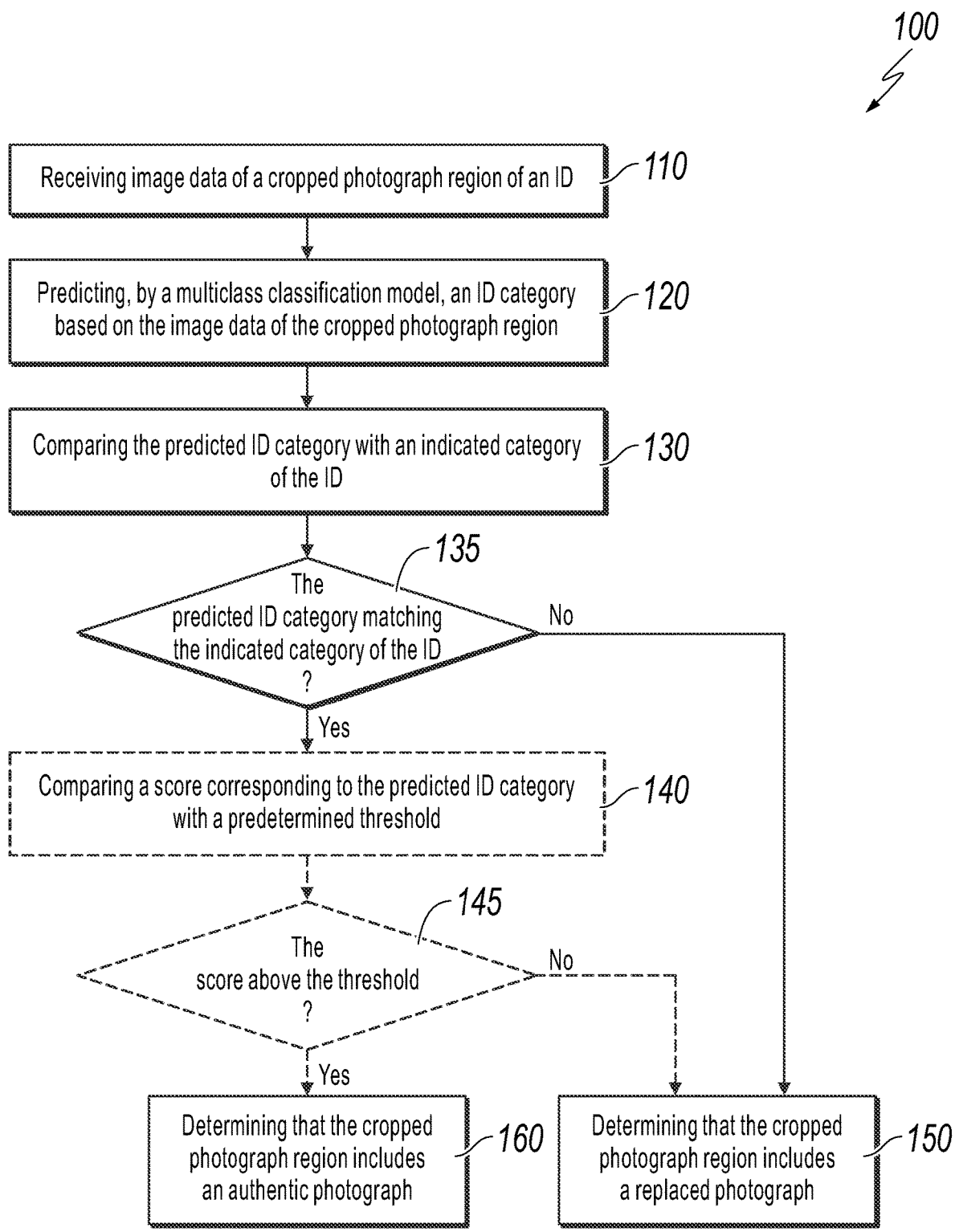
FIG. 1 is a flow chart illustrating an example of a method for detecting photograph replacement in a photo identity document (ID), according to an embodiment.

Skilled artisans will appreciate that elements in the figures are illustrated for simplicity and clarity and have not necessarily been depicted to scale. For example, the dimensions of some of the elements in the illustrations, block diagrams or flowcharts may be exaggerated in respect to other elements to help to improve understanding of the present embodiments.

DETAILED DESCRIPTION

Embodiments will be described, by way of example only, with reference to the drawings. Like reference numerals and characters in the drawings refer to like elements or equivalents.

Some portions of the description which follows are explicitly or implicitly presented in terms of algorithms and functional or symbolic representations of operations on data within a computer memory. These algorithmic descriptions and functional or symbolic representations are the means used by those skilled in the data processing arts to convey most effectively the substance of their work to others skilled in the art. An algorithm is here, and generally, conceived to be a self-consistent sequence of steps leading to a desired result. The steps are those requiring physical manipulations of physical quantities, such as electrical, magnetic or optical signals capable of being stored, transferred, combined, compared, and otherwise manipulated.

Unless specifically stated otherwise, and as apparent from the following, it will be appreciated that throughout the present specification, discussions utilizing terms such as "receiving", "obtaining", "determining", "predicting", "calculating", "training", "matching", "generating", "detecting", "classifying", "setting", "defining", "comparing", "processing", "updating", "entering", "selecting", "authenticating", "providing", "inputting", "outputting", or the like, refer to the action and processes of a computer system, or similar electronic device, that manipulates and transforms data represented as physical quantities within the computer system into other data similarly represented as physical quantities within the computer system or other information storage, transmission or display devices.

The present specification also discloses apparatuses for performing the operations of the methods. Such apparatuses may be specially constructed for the required purposes, or may comprise a computer or other device selectively activated or reconfigured by a computer program stored in the computer. The algorithms and displays presented herein are not inherently related to any particular computer or other apparatus. Various machines may be used with programs in accordance with the teachings herein. Alternatively, the construction of more specialized apparatus to perform the required method steps may be appropriate. The structure of a computer suitable for executing the various methods/processes described herein will appear from the description below.

In addition, the present specification also implicitly discloses a computer program, in that it would be apparent to the person skilled in the art that the individual steps of the method described herein may be put into effect by computer code. The computer program is not intended to be limited to any particular programming language and implementation thereof. It will be appreciated that a variety of programming languages and coding thereof may be used to implement the teachings of the specification contained herein. Moreover, the computer program is not intended to be limited to any particular control flow. There are many other variants of the computer program, which can use different control flows without departing from the scope of the specification.

Furthermore, one or more of the steps of the computer program may be performed in parallel rather than sequentially. Such a computer program may be stored on any computer readable medium. The computer readable medium may include storage devices such as magnetic or optical disks, memory chips, or other storage devices suitable for interfacing with a computer. The computer readable medium may also include a hard-wired medium such as exemplified in the Internet system, or wireless medium such as exemplified in the GSM mobile telephone system. The computer program when loaded and executed on such a computer effectively results in an apparatus that implements the steps of the preferred method.

The present specification may also be implemented as hardware modules. More particularly, in the hardware sense, a module is a functional hardware unit designed for use with other components or modules. For example, a module may be implemented using discrete electronic components, or it can form a portion of an entire electronic circuit such as an Application Specific Integrated Circuit (ASIC) or Field Programmable Gate Array (FPGA). Numerous other possibilities exist. Those skilled in the art will appreciate that the system can also be implemented as a combination of hardware and software modules.

Photograph replacement detection in the act or process of verifying the authenticity of an ID can be considered as a form of fraud detection or fake identity detection, in which legitimacy of users are verified and potential fraudsters may be detected before fraudulent acts are carried out. Effective identity authentication can enhance data security of systems by permitting only authenticated users to access its protected resources. Embodiments seek to provide methods and systems for detecting photograph replacement in photo IDs thereby detecting fake ID images uploaded by fraudsters. Advantageously, financial risks such as money laundering and fraud can be effectively reduced or eliminated.

The techniques described in this specification produce one or more technical effects. A method is provided to detect photograph replacement of a photo ID by utilizing a multiclass classification model. In implementations, the multiclass classification model may include a set of predefined classes corresponding to various categories of IDs. Different from a binary classification technique, which classifies IDs as real ID or fake ID (i.e., ID with a replaced photograph) and involves intensive data labelling work, no work of data labeling of real/fake ID is required for training the multiclass classification model. Further, the multiclass classification model does not require samples of fake IDs for training, which advantageously eliminates the effort of producing numerous fake ID samples in order to achieve a high accuracy.

FIG. 1 is a flow chart 100 illustrating an example method for detecting photograph replacement in a photo ID including the following steps:

110: receiving image data of a cropped photograph region of an ID, wherein the ID includes a photograph and the cropped photograph region includes at least the photograph;

120: predicting, by a multiclass classification model, an ID category based on the image data of the cropped photograph region, wherein the predicted ID category corresponds to one of a set of predefined classes in the multiclass classification model;

130: comparing the predicted ID category with an indicated category of the ID;

135: determining if the predicted ID category matches the indicated category of the ID; and 150: in response to the predicted ID category mismatching the indicated category of the ID, determining that the cropped photograph region includes a replaced photograph.

At step 110, image data of a cropped photograph region of a photo ID is received. A photo ID can be in a form of a card (such as a national identity cards or a driver license), a document (such as a passport or a birth certificate), or the like. The cropped photograph region includes at least the photograph on the photo ID. In some implementations, area of the cropped photograph region may be larger than the size of the photograph, thereby additionally including some background surrounding the photograph. Advantageously, some features of the particular category of ID can be included in the cropped photograph region, which can well describe a style of the photograph region and provide useful information during classification. Such features can include colors and patterns in the photograph region, security features, background color of the photograph, or the like. Depending on the category of the ID, some IDs may also have texts surrounding the photograph, such as ID owner's printed name, gender, date of birth, country of birth, country of issue, or ID number. Some IDs may have images around the photograph, such as ID owner's signature, national emblem of the country of issue, or a smaller version of the photograph. As features and styles of an ID are unique and difficult to falsify, including these features in the cropped photograph region can contribute to effective detection of photograph replacement on the ID.

To include a background surrounding the photograph, in some implementations, assuming the photograph has a height of H and a width of W, the height of the cropped photograph region may be determined as between H and $R_H*H$ and width may be determined as between W and $R_W*W$ ($R_H$, $R_W$>1). For example, the cropped photograph region may have a height of 1.2*H and a width of 1.2*W. One may appreciate that $R_H$ and $R_W$ are predetermined ratios that can be same or different, as long as the photograph is included therein. The implementations are not limited.

At step 120, based on the image data of the cropped photograph region, an ID category is predicted by the multiclass classification model. The model can have a set of predefined classes, with each class corresponding to a specific category of ID (e.g. Class 1—a Singapore National Registration Identity Card, Class 15—a Hong Kong Permanent Identity Card, Class 30—a US driver license, Class 55—a Philippines National ID card, Class 71—an Australian passport, and so on). The predicted ID category will be one of the predefined classes, based on the result of the classification. In some implementations, predicting the ID category based on the image data of the cropped photograph region includes: inputting the image data to the multiclass classification model, and outputting a score for each class in the set of the predefined classes. The respective scores may reflect probabilities of the cropped photograph region from a respective ID category. Thereafter, a class with a highest score can be determined as the predicted ID category. One may appreciate that this is one of the many possible implementations for predicting the ID category and is non-limiting.

At step 130, the predicted ID category is compared with an indicated category of the ID. In some implementations, the indicated category of the ID can be entered or selected by a user during an identity verification process (such as eKYC). Alternatively, the identity verification system may indicate to the user to upload a certain category of the ID, which will be the indicated category of the ID. A comparison of the predicted ID category outputted by the model and the indicated category of the ID is made at step 135. If the predicted ID category mismatches the indicated category of the ID, the method proceeds to step 150 and determines that the cropped photograph region includes a replaced photograph. If the predicted ID category matches the indicated category of the ID, the method may proceed to step 160 and determine that the photograph in the cropped photograph region is an authentic photograph on the photo ID.

Optionally, after determining that the predicted ID category matches the indicated category of the ID, the method may include additional steps 140 and 145 before concluding if the photograph in the cropped photograph region has been replaced. In some implementations, the additional steps involve predetermining a threshold value in relation to the outputted scores and comparing the highest score with the predetermined threshold. If the highest score is below the predetermined threshold, the method proceeds to step 150 and determines that the cropped photograph region includes a replaced photograph. If the highest score is equal to or above the predetermined threshold, the method may proceed to step 160 and determine that the photograph in the cropped photograph region is an authentic photograph on the photo ID. These additional steps 140 and 145 are advantageous in situations when a replaced photograph has been used and the multiclass classification model outputs low scores for all the classes (e.g., ≤40 out of 100 for all scores), which implies that the probability of the cropped photograph region from any category of ID is low. In such situations, an ID category will still be predicted at step 120 by selecting the highest score (e.g. 40), and there is a chance the predicted ID category may match with the indicated category of the ID. With the additional steps, in response to the predicted ID category matching the indicated category of the ID, if the highest score (e.g. 40) is below the preset threshold (e.g. 95 out of 100), the method will still proceed to step 150 and determine that the cropped photograph region includes a replaced photograph. One may appreciate that false positives in the photograph replacement detection can be reduced by setting and tuning the threshold.

The present specification may further provide methods, apparatuses, and systems for training the multiclass classification model based on samples of cropped photograph regions of IDs. Assuming samples of cropped photograph regions of N categories of photo IDs are provided, a classification model of N classes can be trained with each class corresponding to each category of the photo IDs. In some embodiments, the classification model can be trained with convolutional neural network (CNN), which is one of the deep neural networks widely used to analyze visual imagery. One may appreciate that the multiclass classification model can be efficiently trained and developed without any data labelling required in a binary classification task. Further, more image data of cropped photograph regions can be collected when the classification model is implemented to detect photograph replacement of received IDs. Optionally, the samples of cropped photograph regions used for training the classification model may be updated by including new cropped photograph regions of the received IDs, which may enhance the future training models and improve the accuracy.

Figure 2:
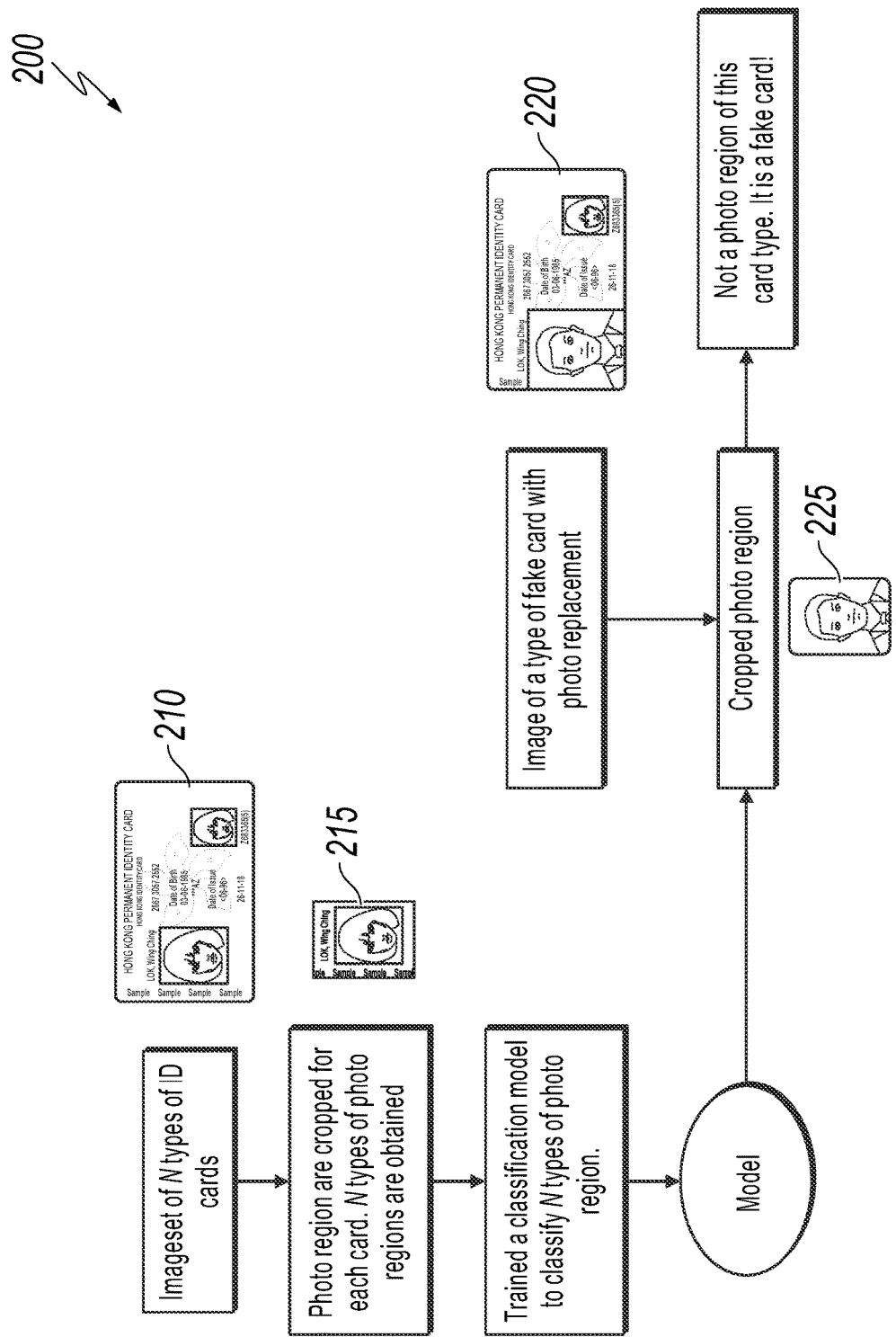
FIG. 2 is a flow diagram illustrating an example of an implementation of the method in FIG. 1, according to an embodiment.

FIG. 2 is an example flow diagram 200 illustrating an implementation of the method in FIG. 1. The left part of the flow diagram directs to training the multiclass classification model. In the beginning of the process, there is provided an image set of N categories of ID cards. An example is shown for an image 210 of a Hong Kong Permanent ID card. A cropped photograph region 215 can be obtained by cropping from the image 210. One may appreciate that the cropped photograph region 215 includes the photograph as well as some background surrounding the photograph. In a similar manner, samples of N types cropped photograph regions can be obtained from the image set of the N categories of photo IDs. Next, a classification model is trained to classify N types of photograph regions.

The trained model can be used for detecting photograph replacement of a received ID. A cropped photograph region 225 is obtained from an image 220 of the received ID. In this case, the received ID is a fake Hong Kong ID which includes a replaced photograph from a Philippines Unified Multi-Purpose ID card. By inputting the cropped photograph region 225 into the classification model, the model will likely predict an ID category to be Philippines Unified Multi-Purpose ID, which is different from the indicated category of Hong Kong ID. As such, it is determined that the received ID is a fake ID with a replaced photograph.

In implementations, the image 220 of the received ID may be uploaded via webpages or mobile applications. The cropped photograph region 225 can be obtained by cropping a photograph region 225 from the image 220 of the ID based on the indicated category of the ID and photograph location information corresponding to the indicated category. For example, if the received ID is indicated to be a Hong Kong ID card, and on Hong Kong ID card the photo region may be at (0.10*h→0.75*h, 0.05*w→0.35*w) where (h,w) is (height, width) of ID card, then one can use this photograph location information to crop the photograph region from an image of a Hong Kong ID card.

Figure 3:
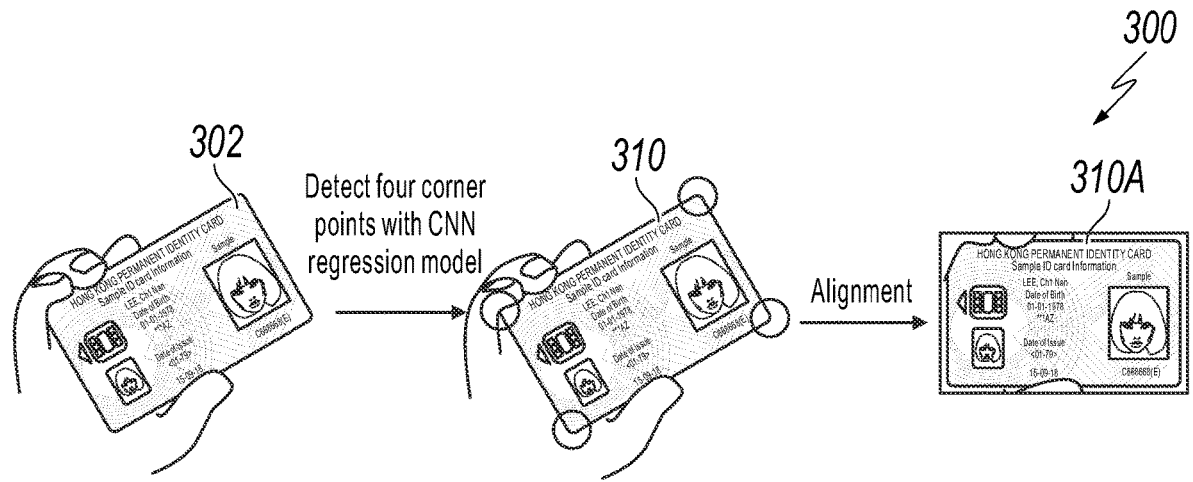
FIG. 3 is a schematic of an example of ID card alignment, according to an embodiment.

In some implementations, obtaining the cropped photograph region can further include pre-processing the image of the ID to generate an aligned image of the ID. FIG. 3 is a schematic 300 of an example of ID card alignment. As shown in the figure, an image 302 is received which includes an ID card 310, and the ID card 310 is tilted in the image. In the next step, the four corner points of the ID card 310 can be detected by machine learning techniques, such as a CNN regression model. By performing alignment, an aligned ID card image 310A can be generated. One can then obtain the cropped photograph region using the aforementioned method, by cropping a region based on the photograph location information of the specific category of ID. The techniques for cropping a photograph region from a photo ID can be used for both the received ID and the image set of IDs for training the model.

One may appreciate that training the model and using the model for photograph replacement detection can be two separate processes, performed by either the same party or different parties. Further, the photograph replacement detection method can be implemented alone or in combination with other methods of identity verification and identity proofing. The implementations are not limited.

Figure 4:
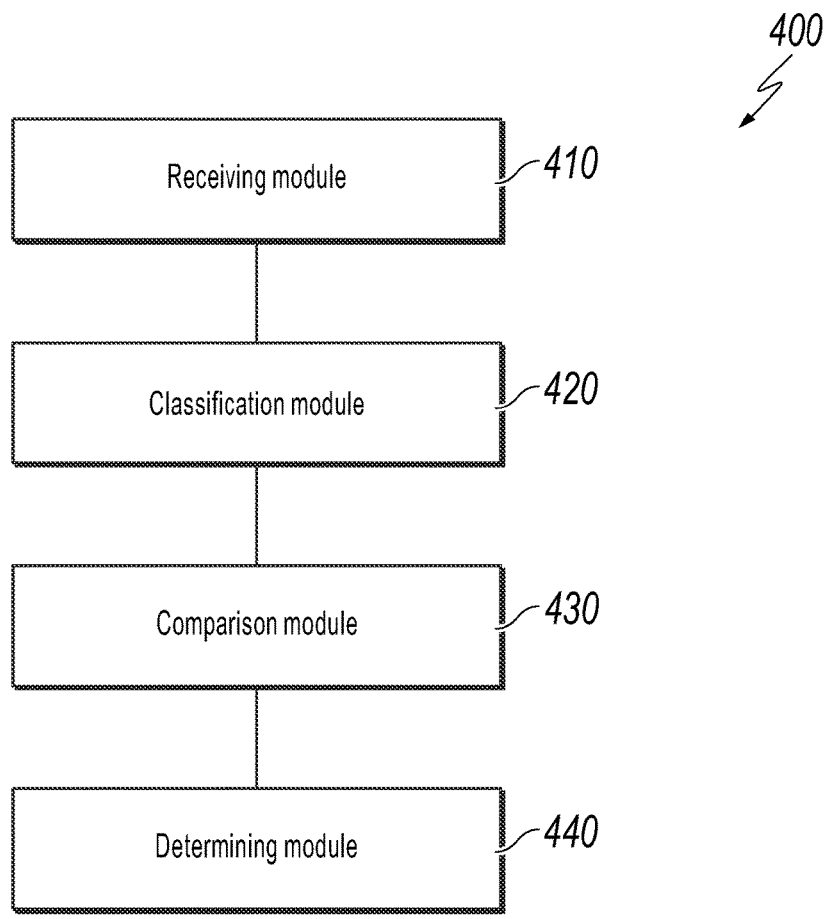
FIG. 4 is a schematic diagram of an example of modules of an apparatus for detecting photograph replacement in a photo ID, according to an embodiment.

FIG. 4 is a schematic diagram of an example apparatus 400 including modules for detecting photograph replacement in a photo ID. The apparatus 400 at least includes a receiving module 410, a classification module 420, a comparison module 430, and a determining module 440. With reference to FIG. 1 and FIG. 2, the receiving module 410 can be configured to receive image data of a cropped photograph region of an ID, and receive information on an indicated category of the ID entered/selected by a user. The classification module 420 can be configured to predict an ID category based on the image data of the cropped photograph region received by the receiving module 410. The comparison module 430 can be configured to compare the predicted ID category with the indicated category of the ID, and compare the score corresponding to the predicted ID category with a predetermined threshold. The determining module 440 can be configured to determine if the cropped photograph region includes a replaced photograph based on if the predicted ID category matches the indicated category of the ID, and based on if the score is above the predetermined threshold. The apparatus 400 may additionally include a training module configured to train the multiclass classification model. The apparatus 400 may also include an ID image processing module configured to pre-process a received ID image, generate an aligned ID image, and crop a photograph region. The apparatus 400 may also include an output module configured to output the photograph replacement detection result obtained by the determining module 440. One or more or any combination of these modules can be part of an apparatus for detecting photograph replacement in a photo ID.

The system, apparatus, module, or unit illustrated in the previous embodiments can be implemented by using a computer chip or an entity, or can be implemented by using a product having a certain function. A typical embodiment device is a computer (and the computer can be a personal computer), a laptop computer, a cellular phone, a camera phone, a smartphone, a personal digital assistant, a media player, a navigation device, an email receiving and sending device, a game console, a tablet computer, a wearable device, or any combination of these devices. The modules described as separate parts may or may not be physically separate, and parts displayed as modules may or may not be physical modules, may be located in one position, or may be distributed on a number of network modules. Some or all of the modules can be selected based on actual demands to achieve the objectives of the solutions of the specification. A person of ordinary skill in the art can understand and implement the embodiments of the present application without creative efforts.

Figure 5:
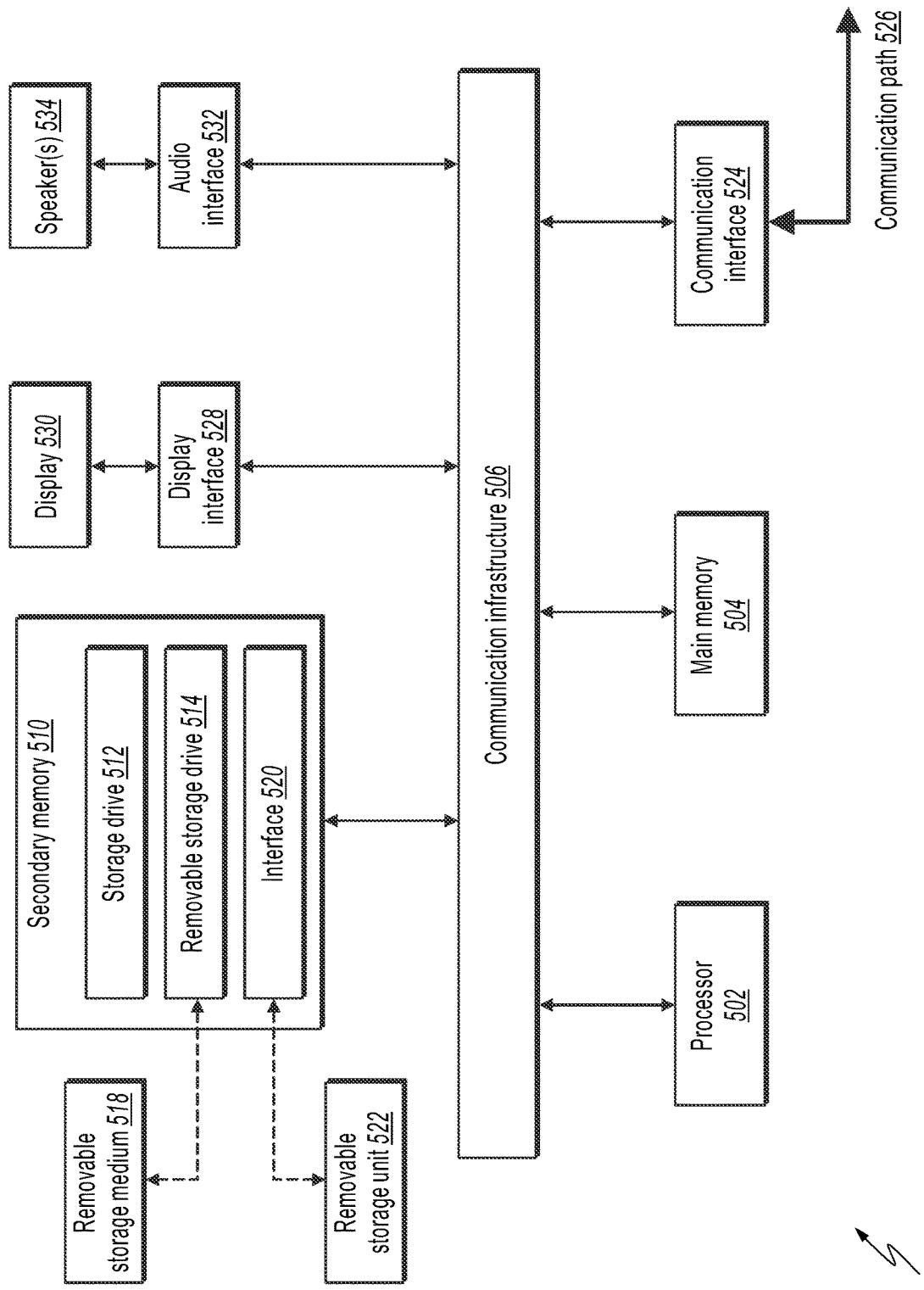
FIG. 5 is a block diagram of an example of a computer system suitable for executing at least some steps of the example methods shown in FIGS. 1 and 2, according to an embodiment.

FIG. 5 is a block diagram of an example computer system 500 suitable for executing at least some steps of the example methods shown in FIGS. 1 and 2. The following description of the computer system/computing device 500 is provided by way of example only and is not intended to be limiting.

As shown in FIG. 5, the example computing device 500 includes a processor 502 for executing software routines. Although a single processor is shown for the sake of clarity, the computing device 500 may also include a multi-processor system. The processor 502 is connected to a communication infrastructure 506 for communication with other components of the computing device 500. The communication infrastructure 506 may include, for example, a communications bus, cross-bar, or network.

The computing device 500 further includes a main memory 504, such as a random access memory (RAM), and a secondary memory 510. The secondary memory 510 may include, for example, a storage drive 512, which may be a hard disk drive, a solid state drive or a hybrid drive and/or a removable storage drive 514, which may include a magnetic tape drive, an optical disk drive, a solid state storage drive (such as a USB flash drive, a flash memory device, a solid state drive or a memory card), or the like. The removable storage drive 514 reads from and/or writes to a removable storage medium 518 in a well-known manner. The removable storage medium 518 may include magnetic tape, optical disk, non-volatile memory storage medium, or the like, which is read by and written to by removable storage drive 514. As will be appreciated by persons skilled in the relevant art(s), the removable storage medium 518 includes a computer readable storage medium having stored therein computer executable program code instructions and/or data.

In an alternative implementation, the secondary memory 510 may additionally or alternatively include other similar means for allowing computer programs or other instructions to be loaded into the computing device 500. Such means can include, for example, a removable storage unit 522 and an interface 520. Examples of a removable storage unit 522 and interface 520 include a program cartridge and cartridge interface (such as that found in video game console devices), a removable memory chip (such as an EPROM or PROM) and associated socket, a removable solid state storage drive (such as a USB flash drive, a flash memory device, a solid state drive or a memory card), and other removable storage units 522 and interfaces 520 which allow software and data to be transferred from the removable storage unit 522 to the computer system 500.

The computing device 500 also includes at least one communication interface 524. The communication interface 524 allows software and data to be transferred between computing device 500 and external devices via a communication path 526. In various embodiments of the specification, the communication interface 524 permits data to be transferred between the computing device 500 and a data communication network, such as a public data or private data communication network. The communication interface 524 may be used to exchange data between different computing devices 500 which such computing devices 500 form part an interconnected computer network. Examples of a communication interface 524 can include a modem, a network interface (such as an Ethernet card), a communication port (such as a serial, parallel, printer, GPIB, IEEE 1394, RJ45, USB), an antenna with associated circuitry and the like. The communication interface 524 may be wired or may be wireless. Software and data transferred via the communication interface 524 are in the form of signals which can be electronic, electromagnetic, optical or other signals capable of being received by communication interface 524. These signals are provided to the communication interface via the communication path 526.

As shown in FIG. 5, the computing device 500 further includes a display interface 528 which performs operations for rendering images to an associated display 530 and an audio interface 532 for performing operations for playing audio content via associated speaker(s) 534.

As used herein, the term "computer program product" may refer, in part, to removable storage medium 518, removable storage unit 522, a hard disk installed in storage drive 512, or a carrier wave carrying software over communication path 526 (wireless link or cable) to communication interface 524. Computer readable storage media refers to any non-transitory, non-volatile tangible storage medium that provides recorded instructions and/or data to the computing device 500 for execution and/or processing. Examples of such storage media include magnetic tape, CD-ROM, DVD, Blu-Ray™ Disc, a hard disk drive, a ROM or integrated circuit, a solid state storage drive (such as a USB flash drive, a flash memory device, a solid state drive or a memory card), a hybrid drive, a magneto-optical disk, or a computer readable card such as a PCMCIA card and the like, whether or not such devices are internal or external of the computing device 500. Examples of transitory or non-tangible computer readable transmission media that may also participate in the provision of software, application programs, instructions and/or data to the computing device 500 include radio or infra-red transmission channels as well as a network connection to another computer or networked device, and the Internet or Intranets including e-mail transmissions and information recorded on Websites and the like.

The computer programs (also called computer program code) are stored in main memory 504 and/or secondary memory 510. Computer programs can also be received via the communication interface 524. Such computer programs, when executed, enable the computing device 500 to perform one or more features of embodiments discussed herein. In various embodiments, the computer programs, when executed, enable the processor 607 to perform features of the above-described embodiments. Accordingly, such computer programs represent controllers of the computer system 500.

Software may be stored in a computer program product and loaded into the computing device 500 using the removable storage drive 514, the storage drive 512, or the interface 520. The computer program product may be a non-transitory computer readable medium. Alternatively, the computer program product may be downloaded to the computer system 500 over the communication path 526. The software, when executed by the processor 502, causes the computing device 500 to perform the necessary operations to execute the method as shown in FIGS. 1 and 2.

It is to be understood that the embodiment of FIG. 5 is presented merely by way of example to explain the operation and structure of the system 500. Therefore, in some embodiments one or more features of the computing device 500 may be omitted. Also, in some embodiments, one or more features of the computing device 500 may be combined together. Additionally, in some embodiments, one or more features of the computing device 500 may be split into one or more component parts.

It will be appreciated that the elements illustrated in FIG. 5 function to provide means for performing the various functions and operations of the system as described in the above embodiments.

It will be appreciated by a person skilled in the art that numerous variations and/or modifications may be made to the present specification as shown in the specific embodiments without departing from the scope of the specification as broadly described. The present embodiments are, therefore, to be considered in all respects to be illustrative and not restrictive.

What is claimed is:

1. A computer-implemented method for detecting identity document photograph replacement, comprising:
   receiving image data of a cropped photograph region of an identity document (ID), wherein the ID comprises a photograph, and wherein the cropped photograph region comprises at least the photograph;
   predicting, by a multiclass classification model and as a predicted ID category, an ID category based on the image data of the cropped photograph region, wherein the predicted ID category corresponds to a predefined class of a set of predefined classes in the multiclass classification model;

comparing the predicted ID category with an indicated category of the ID; and in response to a calculated mismatch between the predicted ID category and the indicated category of the ID, determining that the cropped photograph region includes a replaced photograph.

2. The computer-implemented method of claim 1, wherein the cropped photograph region further comprises a background surrounding the photograph.

3. The computer-implemented method of claim 2, wherein the photograph has a height of H and a width of W, and the cropped photograph region has a height between H and $R_H*H$ and a width between W and $R_W*W$, wherein $R_H$ and $R_W$ are predetermined ratios that are greater than 1.

4. The computer-implemented method of claim 1, wherein receiving image data of a cropped photograph region of an ID comprises:

receiving an image of the ID;

pre-processing the image of the ID to generate an aligned image of the ID; and cropping a photograph region from the aligned image of the ID based on the indicated category of the ID and photograph location information corresponding to the indicated category of the ID.

5. The computer-implemented method of claim 1, wherein predicting the ID category based on the image data of the cropped photograph region comprises:

inputting the image data to the multiclass classification model;

outputting a score for each predefined class of the set of predefined classes; and determining the ID category, wherein the ID category corresponds to a predefined class of the set of predefined classes with a highest score.

6. The computer-implemented method of claim 5, further comprising:

setting a threshold for the highest score; and in response to the predicted ID category matching the indicated category of the ID and the highest score less than the threshold, determining that the cropped photograph region comprises a replaced photograph.

7. The computer-implemented method of claim 1, wherein the indicated category of the ID is entered or selected by a user.

8. The computer-implemented method of claim 1, wherein the set of predefined classes comprises national ID cards, passports, driver licenses from one or more countries.

9. The computer-implemented method of claim 1, wherein the multiclass classification model is trained by:

providing sample images of N categories of photo IDs;

generating cropped photograph regions based on the sample images of N categories of photo IDs; and training a classification model, wherein the classification model has N classes based on the cropped photograph regions, and wherein the N classes correspond to N categories of photo IDs.

10. The computer-implemented method of claim 9, wherein generating cropped photograph regions based on the sample images of N categories of photo IDs comprises:

pre-processing at least one sample image of the sample images of N categories of photo IDs to generate an aligned image of the photo ID; and cropping, based on a category of the photo ID and photograph location information corresponding to the category of the photo ID, a photograph region from the aligned image of the photo ID.

11. The computer-implemented method of claim 9, further comprising:

updating the cropped photograph regions from the sample images of N categories of photo IDs that were used to train the classification model by including the image data of the cropped photograph regions.

12. The computer-implemented method of claim 9, wherein training the classification model based on the cropped photograph regions is based on a convolutional neural network (CNN) algorithm.

13. A non-transitory computer-readable medium storing one or more instructions executable by a computer system to perform operations for detecting identity document photograph replacement, comprising:

receiving image data of a cropped photograph region of an identity document (ID), wherein the ID comprises a photograph, and wherein the cropped photograph region comprises at least the photograph;

predicting, by a multiclass classification model and as a predicted ID category, an ID category based on the image data of the cropped photograph region, wherein the predicted ID category corresponds to a predefined class of a set of predefined classes in the multiclass classification model;

comparing the predicted ID category with an indicated category of the ID; and in response to a calculated mismatch between the predicted ID category and the indicated category of the ID, determining that the cropped photograph region includes a replaced photograph.

14. The non-transitory computer-readable medium of claim 13, wherein the cropped photograph region further comprises a background surrounding the photograph.

15. The non-transitory computer-readable medium of claim 14, wherein the photograph has a height of H and a width of W, and the cropped photograph region has a height between H and $R_H*H$ and a width between Wand $R_W*W$, wherein $R_H$ and $R_W$ are predetermined ratios that are greater than 1.

16. The non-transitory computer-readable medium of claim 13, wherein receiving image data of a cropped photograph region of an ID comprises:

receiving an image of the ID;

pre-processing the image of the ID to generate an aligned image of the ID; and cropping a photograph region from the aligned image of the ID based on the indicated category of the ID and photograph location information corresponding to the indicated category of the ID.

17. The non-transitory computer-readable medium of claim 13, wherein predicting the ID category based on the image data of the cropped photograph region comprises:

inputting the image data to the multiclass classification model;

outputting a score for each predefined class of the set of predefined classes; and determining the ID category, wherein the ID category corresponds to a predefined class of the set of predefined classes with a highest score.

18. The non-transitory computer-readable medium of claim 17, further comprising operations for:

setting a threshold for the highest score; and in response to the predicted ID category matching the indicated category of the ID and the highest score less than the threshold, determining that the cropped photograph region comprises a replaced photograph.

19. The non-transitory computer-readable medium of claim 13, wherein the indicated category of the ID is entered or selected by a user.

20. The non-transitory computer-readable medium of claim 13, wherein the set of predefined classes comprises national ID cards, passports, driver licenses from one or more countries.

21. The non-transitory computer-readable medium of claim 13, wherein the multiclass classification model is trained by:
providing sample images of N categories of photo IDs;
generating cropped photograph regions based on the sample images of N categories of photo IDs; and
training a classification model, wherein the classification model has N classes based on the cropped photograph regions, and wherein the N classes correspond to N categories of photo IDs.

22. The non-transitory computer-readable medium of claim 21, wherein generating cropped photograph regions based on the sample images of N categories of photo IDs comprises:
pre-processing at least one sample image of the sample images of N categories of photo IDs to generate an aligned image of the photo ID; and
cropping, based on a category of the photo ID and photograph location information corresponding to the category of the photo ID, a photograph region from the aligned image of the photo ID.

23. The non-transitory computer-readable medium of claim 21, further comprising operations for:
updating the cropped photograph regions from the sample images of N categories of photo IDs that were used to train the classification model by including the image data of the cropped photograph regions.

24. The non-transitory computer-readable medium of claim 21, wherein training the classification model based on the cropped photograph regions is based on a convolutional neural network (CNN) algorithm.

25. A computer-implemented system for detecting identity document photograph replacement, comprising:
one or more computers; and
one or more computer memory devices interoperably coupled with the one or more computers and having tangible, non-transitory, machine-readable media storing one or more instructions that, when executed by the one or more computers, cause the one or more computers to perform one or more operations comprising:
receiving image data of a cropped photograph region of an identity document (ID), wherein the ID comprises a photograph, and wherein the cropped photograph region comprises at least the photograph;
predicting, by a multiclass classification model and as a predicted ID category, an ID category based on the image data of the cropped photograph region, wherein the predicted ID category corresponds to a predefined class of a set of predefined classes in the multiclass classification model;
comparing the predicted ID category with an indicated category of the ID; and
in response to a calculated mismatch between the predicted ID category and the indicated category of the ID, determining that the cropped photograph region includes a replaced photograph.

* * * * *